Aug. 5, 1941.  H. R. YOUNG  2,251,863
MACHINE TOOL DRIVE
Filed Feb. 27, 1940  3 Sheets-Sheet 1

Inventor:—
Harry Russell Young
by his Attorneys
Howson & Howson

Aug. 5, 1941.     H. R. YOUNG     2,251,863
MACHINE TOOL DRIVE
Filed Feb. 27, 1940     3 Sheets-Sheet 3

Inventor:—
Harry Russell Young
by his Attorneys
Howson & Howson

Patented Aug. 5, 1941

2,251,863

UNITED STATES PATENT OFFICE 2,251,863

MACHINE TOOL DRIVE

Harry Russell Young, Lower Merion, Pa., assignor to William Sellers & Company, Incorporated, Philadelphia, Pa., a corporation of Pennsylvania Application February 27, 1940, Serial No. 321,101

8 Claims. (Cl. 29—26)

This invention relates to machine tools, and more particularly to a drive for controlling the several movements of the various operating parts of machine tools such as horizontal boring and milling machines.

Such machines usually comprise a bed or work support upon which is mounted for longitudinal movement a saddle which, in turn, bears a table mounted for transverse movement. Columns arise from opposite ends of the bed, one carrying a boring head and the other an outboard support for the boring spindle. The head and outboard support are vertically shiftable upon their respective columns and the head carries a spindle, or spindles, which must be both rotated and longitudinally shifted. Since the spindle rotation and traverse of one of the movable elements must take place simultaneously, separate driving transmissions must be provided to take care of these operations. The transmission governing the rotation of the spindle must be made reversible to enable use of right or left-hand cutters, taps or the like, and the transmission controlling the spindle feed must derive its power from the spindle itself for, obviously, in tapping, thread-cutting operations and the like the rotative speed of the spindle must be accurately correlated to the speed at which the spindle is fed. Furthermore, the spindle feed must be reversible simultaneously with the spindle in order that tools such as taps may be properly withdrawn. It will be seen that if this spindle feed transmission is used to control the feeds of the head, saddle and table each time that the spindle feed is reversed or the direction of rotation of the spindle reversed, the direction of operation of the three remaining units would be likewise reversed, with the result that control handles utilized in connecting these parts with the feed transmission will be meaningless as to position, a given position at one time causing feed of the associated unit in one direction and at another time feed of the unit in the opposite direction. It is additionally necessary to provide means whereby the traverse of any of the movable elements, i. e., its movement during those periods when useful work is not performed, should be made very rapidly, and to this end it is ordinarily necessary to provide in the base of the machine, or in association with the moving parts, transmission mechanism for speeding up the operation of the part during such idle periods. Such mechanism is obviously costly and, furthermore, tends to complicate the operation of the machine as a whole.

An important object of this invention is the provision of a construction which, in addition to providing a transmission controlling the feed of the spindle, which may be employed in the operation of the head, table and saddle when it is desired to move those parts at feed rates, likewise embodies a means for providing a rapid traverse of any of these parts without the use of additional transmissions and without interfering in any manner with the operation of the spindle-controlling transmission.

These and other objects I attain by the construction shown in the accompanying drawings wherein, for the purpose of illustration, I have shown a preferred embodiment of my invention and wherein.

Figure 1:
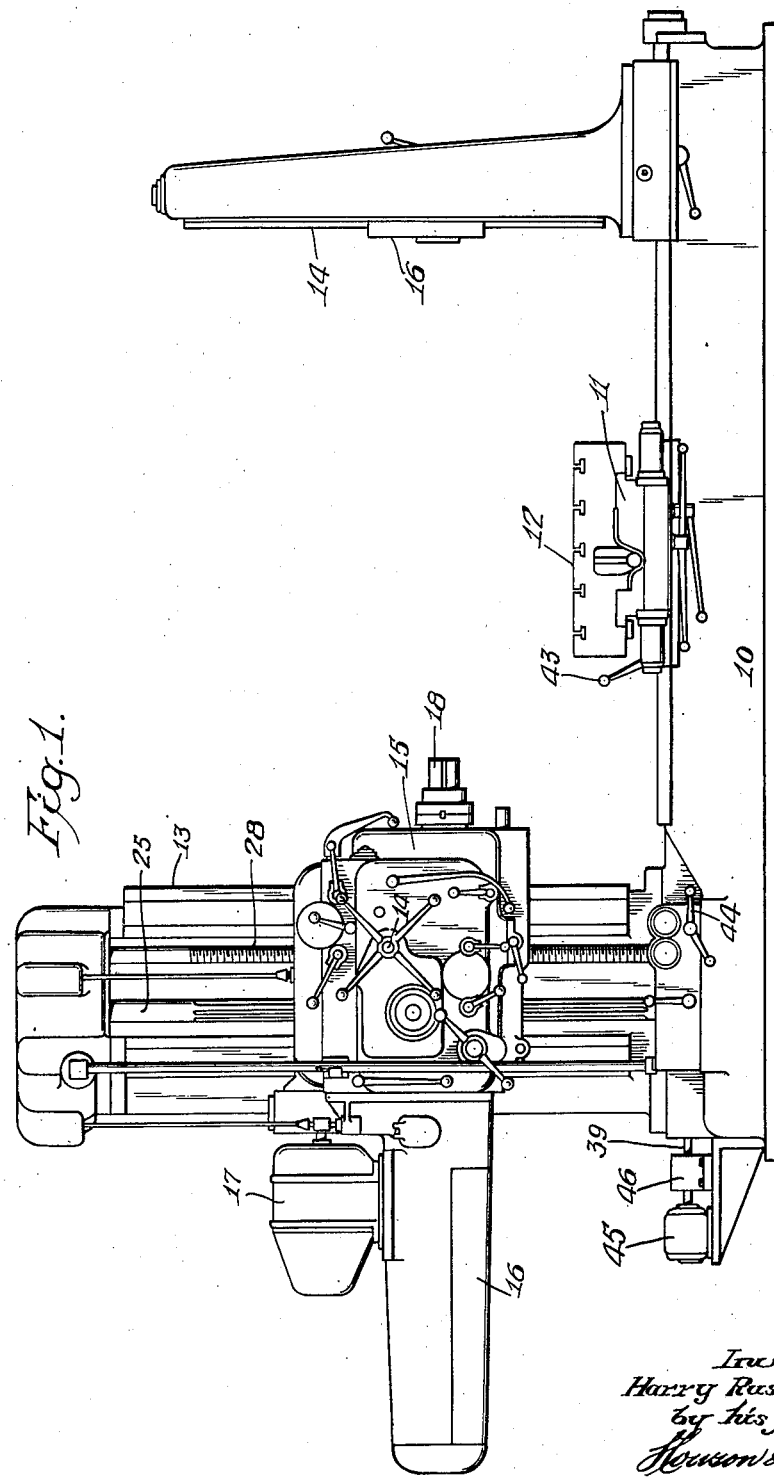
Fig. 1 is a side elevation of a combined boring and milling machine embodying a drive constructed in accordance with my invention.
Figure 2:
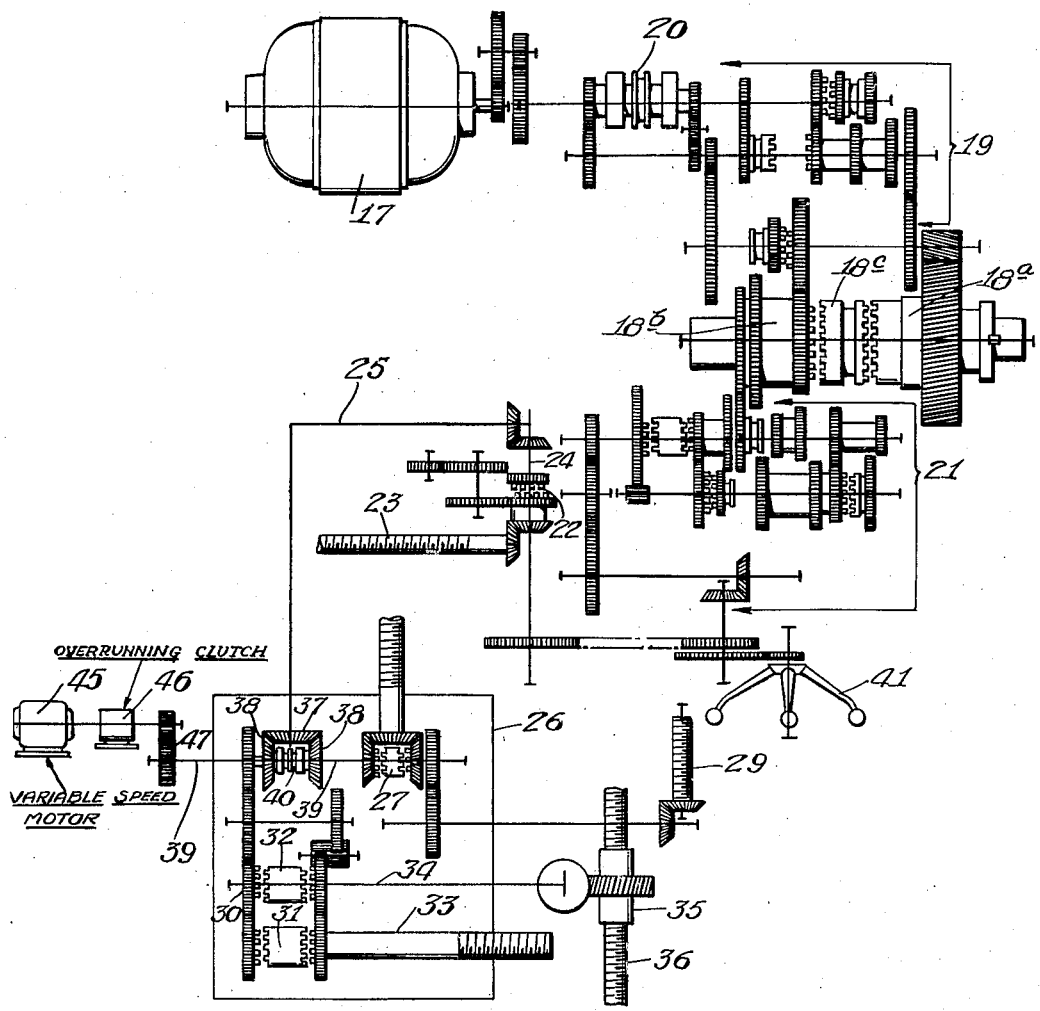
Fig. 2 is a diagrammatic illustration of the transmission mechanism employed.
Figure 3:
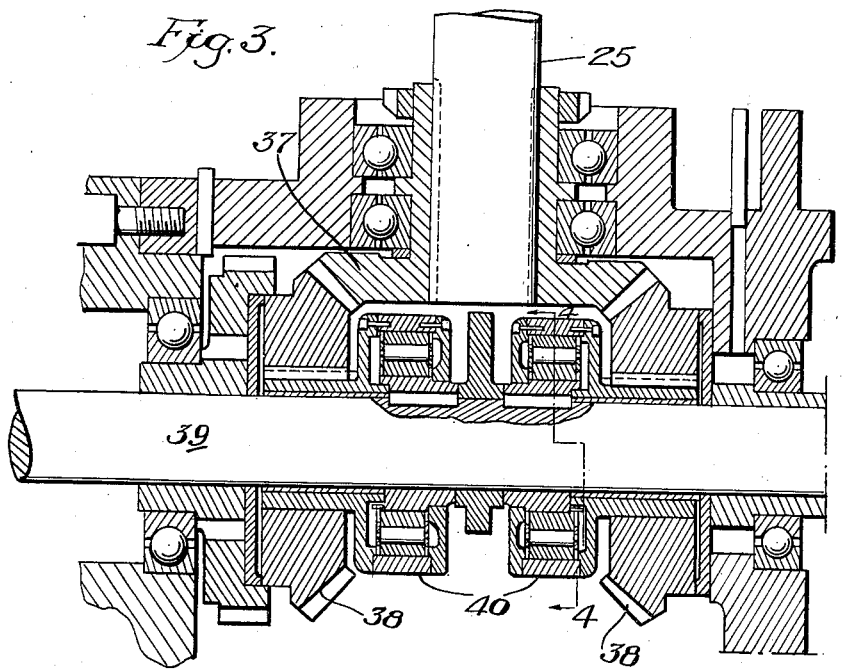
Fig. 3 is an enlarged sectional view through the unidirectional drive.
Figure 4:
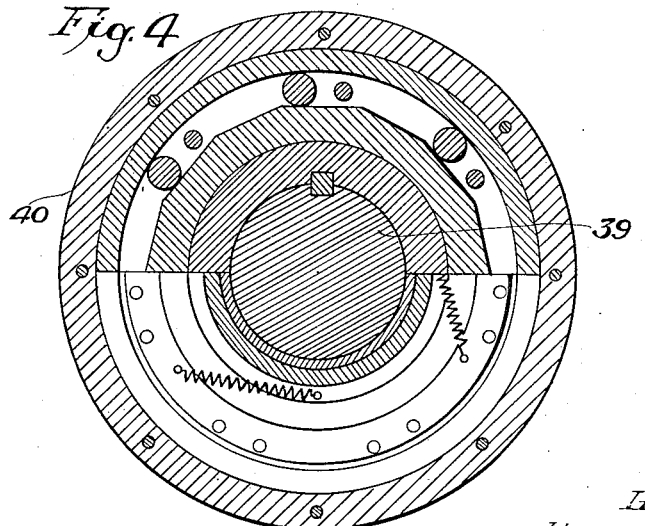
Fig. 4 is a section on line 4—4 of Fig. 3.

Referring now more particularly to the drawings, the numeral 10 generally designates a base upon which is mounted for longitudinal movement a saddle 11 and table 12. Mounted at opposite ends of the base are columns 13 and 14 upon which are mounted for vertical movement a boring head 15 and an outboard support 16. The head supports a driving motor 17 and mounts a spindle, or spindles, 18 for both rotation and longitudinal movement. Contained within the head is a speed control transmission unit 19 driven from the motor through a reversing gearing 20 and driving spindle-operating units 18a and 18b selectively connectable to the spindle by a clutch 18c having a neutral point. Likewise contained in the head and driven from the unit 18b is a feed control transmission 21 driving, through a reversing gear 22, the spindle feed screw 23. The output shaft 24 of the feed control transmission drives a vertical lay shaft 25 which, as in general constructions, is splined to permit vertical movement of the head. In the base of the machine a casing 26 is provided into which the lower end of the shaft 25 extends, and in this casing are disposed a reversing gear 27 controlling rotation of the screws 28 and 29 which control vertical movement of the head and outboard support respectively and a reversing gear 30 which, through clutches 31 and 32, controls the operation of the saddle feed screw 33 and the table drive shaft 34 operating the drive nut 35 engaging the table feed screw 36. These elements in the main are merely conventionally indicated, since they may be of any usual and well-known construction.

Bevel gear 37 secured to the lower end of lay shaft 25 meshes with a pair of oppositely faced bevel gears 38, loosely mounted on a shaft 39 and each provided with an overrunning clutch 40 through which shaft 39 can be driven in one direction only. It will be obvious that since these gears 38 are oppositely driven by gear 37, shaft 39 will be driven from the bevel gear which is running in the predetermined unidirection without regard to the direction of operation of the spindle feed from which this drive is derived. It is thus possible to utilize a single feed unit in operation of the various movable elements of the machine.

It will be obvious that, since shaft 39 is unidirectional and controls the operation of the various movable elements including head 15 and outboard support 16, which may be considered as a unit, the saddle 11 and table 12, the control levers 42, 43 and 44 controlling respectively the saddle 11, table 12, and head 15, may be so positioned that a movement in a given direction thereof will cause a movement of the associated part in the same direction, and this without regard to whether or not the reversible transmission from which they derive their power is operated in one or the other direction.

The output shaft 24 of the feed unit, in addition to being movable through its motor drive, is movable through a pilot wheel 41 which may be selectively engaged therewith through the usual clutch mechanisms, not herein disclosed. Pilot wheel 41 may, therefore, be employed in operation of any of the movable elements since the output shaft 24 controls, through the several clutches and reversing mechanisms 27, 31, and 32, the operation of each of the movable elements. This feature is of considerable advantage in the type of machine illustrated in that the operator may set the control levers for movement of the selected part in the selected direction and, without reference to the direction of movement of the pilot wheel 41, may shift the selected part in a selected direction. If, for example, while standing close to his work he is able to reach an arm of the pilot wheel but is unable to move that arm through a sufficient arc to enable him to grasp a further arm, he may oscillate the pilot wheel and thereby produce a continuous movement of the affected part in the selected direction. The above-described mechanism is fully set forth in Patent No. 2,123,649, to Ralph L. Cotta, granted July 12, 1938, for "Combined boring and milling machine drive," and forms no part of the present invention except in combination with the mechanism now to be described. However, with only such mechanism the additional transmission mechanism either at the head or one of the remaining movable elements would be necessary to obtain the high speed traverse which is essential to efficiency in the machine.

In accordance with my invention, the shaft 39 is extended and connected to a variable speed motor 45 through an overrunning clutch 46 and, if so desired, through gearing generally indicated at 47. Through any suitable conventional control, the motor 45 may be operated whenever traversing speeds are desired and will not affect the operation of shaft 25 due to the fact that this motor will at all times, when in operation, operate shaft 39 at a speed higher than that at which it could possibly be driven through the feed transmission whereby the overrunning clutches 40 of the unit driving shaft 39 from shaft 25 will disconnect these shafts, permitting direct operation of shaft 39 by the motor. On the other hand, when motor 45 is idle and shaft 39 is being driven from shaft 25 from one or the other of the overrunning clutches 40, the overrunning clutch 46 will become effective permitting free operation of shaft 39 by shaft 25. By use of a variable speed motor the traverse speed resulting from its operation may be controlled at will.

Not only does a mechanism of this type permit a wide variation of traverse speeds without any interference with the operation of the spindle feed control transmissions and without the use of additional transmissions to obtain such traverse, but it likewise prevents the application of sudden loads to the main motor 17 such as ordinarily occur during reversal of movement of continuously reciprocating parts such as the saddle and table often become.

Since the construction of the various elements may be considerably varied and the arrangement of the transmissions and transmitting shafts may likewise be varied to suit any particular set of conditions for which the machine must be constructed, I do not wish to be understood as limiting myself to the particular arrangement therein illustrated except as hereinafter claimed.

I claim:

1. In a machine tool embodying a movable head, an axially movable spindle carried by the head, a reversible variable speed transmission having an output shaft controlling the axial movement of this spindle, a second shaft, a driving connection between the second shaft and the output shaft of the transmission including an overrunning clutch, means including an overrunning clutch to drive said second shaft at a higher speed than that at which it may be driven by the first shaft, moving means for said head, and a reversible driving connection between the second-named shaft and said moving means.

2. In a machine tool embodying a movable head, an axially movable spindle carried by the head, a reversible variable speed transmission having an output shaft controlling the axial movement of the spindle, a second shaft, an irreversible driving connection between said second shaft and the output shaft of the transmission including an overrunning clutch, means to drive said second shaft at a speed higher than at which it may be driven by the first-named shaft including an overrunning clutch, moving means for said head, and a reversible driving connection between the second-named shaft and said moving means.

3. In a machine tool embodying a head, an axially movable spindle carried by said head, a movable work support associated with the head, a reversible variable speed transmission having an output shaft controlling the axial movement of the spindle, a second shaft, a driving connection between said second shaft and the output shaft of the transmission including an overrunning clutch, a moving means for said work support, a reversible driving connection between the second-named shaft and said moving means, and means including a second overrunning clutch for driving said second shaft at a speed higher than that at which it may be driven by the first-named shaft.

4. In a machine tool embodying a movable head, an axially movable spindle carried by the head, a reversible variable speed transmission having an output shaft controlling the axial movement of this spindle, a second shaft, a driving connection between the second shaft and the output shaft of the transmission including an overrunning clutch, means including an overrunning clutch to drive said second shaft at a higher speed than that at which it may be driven by the first shaft, moving means for said head, a reversible driving connection between the second-named shaft and said moving means, and manual means for operating the first-named shaft.

5. In a machine tool embodying a movable head, an axially movable spindle carried by the head, a reversible variable speed transmission having an output shaft controlling the axial movement of the spindle, a second shaft, an irreversible driving connection between said second shaft and the output shaft of the transmission including an overrunning clutch, means to drive said second shaft at a speed higher than at which it may be driven by the first-named shaft including an overrunning clutch, moving means for said head, a reversible driving connection between the second-named shaft and said moving means, and manual means for operating the first-named shaft.

6. In a machine tool embodying a head, an axially movable spindle carried by said head, a movable work support associated with the head a reversible variable speed transmission having an output shaft controlling the axial movement of the spindle, a second shaft, a driving connection between said second shaft and the output shaft of the transmission including an overrunning clutch, a moving means for said work support, a reversible driving connection between the second-named shaft and said moving means, means including a second overrunning clutch for driving said second shaft at a speed higher than that at which it may be driven by the first-named shaft, and manual means for operating the first-named shaft.

7. In a machine tool embodying an axially movable spindle, a movable work support associated therewith, a reversible variable speed transmission having an output shaft controlling the axial movement of the spindle, a second shaft. a driving connection between the second shaft and the output shaft of the transmission including an overrunning clutch disconnecting said output shaft from said second shaft when the speed of the second shaft exceeds that of the output shaft, a motor to drive said second shaft, a second overrunning clutch to disconnect said second shaft from said motor when the motor is idle or operating the second shaft at speeds less than those transmitted to said second shaft by said output shaft, a feeding means for the work support and a reversible driving connection between said feeding means and said second shaft.

8. In a machine tool embodying an axially movable spindle, a movable work support associated therewith, a reversible variable speed transmission having an output shaft controlling the axial movement of the spindle, a second shaft, an irreversible driving connection between the second shaft and the output shaft of the transmission including an overrunning clutch disconnecting said output shaft from said second shaft when the speed of the second shaft exceeds that of the output shaft, a motor to drive said second shaft, a second overrunning clutch to disconnect said second shaft from said motor when the motor is idle or operating the second shaft at speeds less than those transmitted to said second shaft by said output shaft, a feeding means for the work support and a reversible driving connection between said feeding means and said second shaft.

HARRY RUSSELL YOUNG.